UNITED STATES PATENT OFFICE.

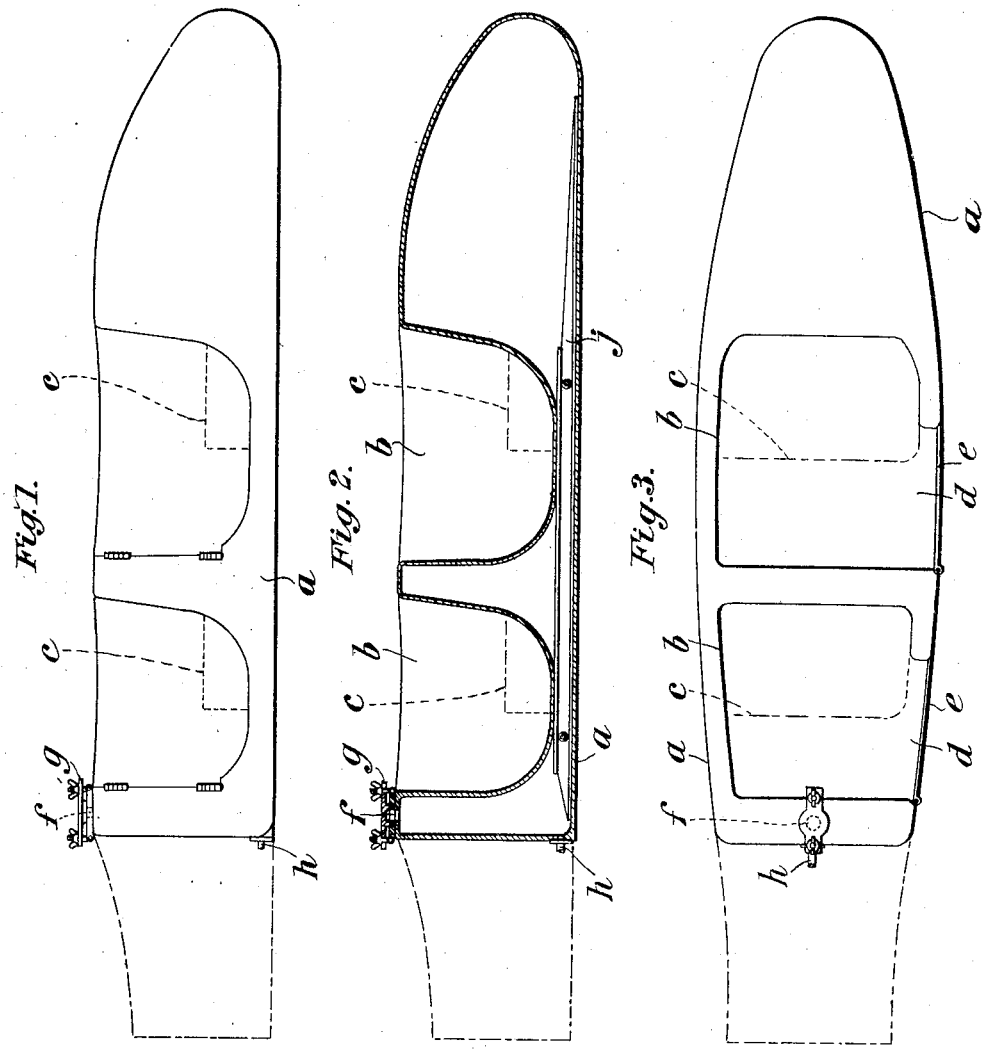

LANCELOT NASH PALMER, OF TOOTING, LONDON, ENGLAND.

TANK FOR VEHICLES.

1,329,998.      Specification of Letters Patent.     Patented Feb. 3, 1920.

Application filed November 20, 1918. Serial No. 263,404.

*To all whom it may concern:*

Be it known that I, LANCELOT NASH PALMER, a subject of the King of Great Britain and Ireland, and residing at 190 Nellison road, Tooting, in the county of London, England, have invented Improvements in or Relating to Tanks for Vehicles, and of which the following is a specification.

The object of this invention is to utilize the space occupied by the body of a motor vehicle, so far as it is not required for seating accommodation, as a reservoir for the storage under pressure or otherwise of the fluid such as petrol, gas, water, or the like, which may be required for use in propelling the vehicle, or for other purpose in connection with the working of same. In the case of petrol and the like it allows of a larger store being carried on the vehicle than when the tank for same is merely one of the accessories attached thereto, or part of the carriage is used for the purpose; and in the case of gas it does away with the resistance to the air offered by the usual capacious gas bag arranged above the cover of the vehicle.

This invention consists in making the body of the car of metal or other suitable material capable of being rendered fluid-tight so as to securely retain the petrol, gas or other fluid under pressure, and in the form of a hollow box or tank, with a recess or depression or depressions within its dimensions to provide a space or spaces for the seat or seats for the driver or passengers, or both, there being a hollow space beneath the floor of every such depression, and all walls at the back or ends of the seats or around the seats, excepting any door or doorway, being formed into hollow chambers opening below into the main or foundation part of the hollow box forming the tank container body.

Parts of the body of a motor road vehicle have been previously described and illustrated as utilizable for a similar purpose as container tanks, but the essential feature of this invention is the utilization of the whole of the body for this purpose with the exception only of such spaces as may be required for seats.

In order that this invention may be better understood reference may be had to the following description of an embodiment thereof, the construction of which is illustrated in the accompanying drawings, of which:—

Figure 1 is a side view of a fluid-proof container tank body for a motor road vehicle.

Fig. 2 is a view in longitudinal section through the body shown in Fig. 1; and

Fig. 3 is a plan view of the same.

In the drawings *a* indicates the outer wall and *b* the inner wall, each constructed of metal plates shaped to the required form, and suitably joined together in a fluid-tight manner, preferably by means of oxy-acetylene welding.

It will be seen that seating accommodation is provided for within the dimensions of the vehicle by forming the inner wall *b* with recesses, within which seats *c* may be secured to studs welded to the said walls *b* or otherwise suitably fixed. The doorways *d*, which open to said seating recesses through the outer and inner walls are preferably fitted with doors *e* of a suitable type. Between the floor of each recess and the outer-wall a light frame or grid *j* may be provided for supporting the floor of the depressions containing the seats.

Fluid, for example petrol, is charged into the tank through the supply aperture *f* covered by a fluid-tight lid *g*, and is withdrawn for use by the motor or otherwise through the feed-pipe *h*.

When the tank body is to be used for containing a gaseous fluid, for example coal-gas, the fluid is preferably subjected to a pressure greater than that of the atmosphere and may be charged through a valve jointed to an aperture conveniently made in one of the walls, and which valve can be opened or closed at will for the admission or retention respectively of fluid, and the pipe *h* is then preferably furnished with a reducing valve for supplying the said gas at uniform pressure to the engine.

I claim:—

1. A tank for a motor road vehicle constructed to form the front, rear, upper, side and under portions of a motor road vehicle body having a walled recess or depression within the dimensions thereof, said recess or depression being open at the top and having a doorway opening thereinto through side outer and inner walls of said tank, in combination with means whereby said tank may be charged and discharged, substantially as described.

2. A tank for a motor road vehicle constructed to form the front, rear, upper, side and under portions of a hollow motor road vehicle body and having a walled recess or depression within the dimensions thereof, said recess or depression being open at the top and having a doorway opening thereinto through outer and inner walls of said tank, in combination with a fluid-tight means whereby said tank may be charged and a pipe whereby it may be discharged, and a door for a doorway opening into said recess or depression, substantially as described.

3. The combination in a tank for motor road vehicles of plating constructed to form the front, rear, upper, side and under portions of a hollow motor road vehicle body, outer and inner walled seating recesses within the dimensions of the said body, said recesses being open at the top and having each a doorway, doors for opening and closing each of said doorways, a lid adapted for the fluid-tight closure of said tank at the upper portion thereof and a pipe at the lower fore portion thereof through which fluid may be withdrawn from said tank, substantially as described for the purposes set forth.

LANCELOT NASH PALMER.